United States Patent [19]

Rasbury et al.

[11] Patent Number: 5,064,715

[45] **Date of Patent: * Nov. 12, 1991**

[54] DIELECTRIC COATING FOR RECORDING MEMBER CONTAINING HYDROPHOBIC SILICA

[75] Inventors: Vincent K. Rasbury; Charles K. Nordeen, both of St. Paul, Minn.

[73] Assignee: Minnesota Mining and Manufacturing Company, Saint Paul, Minn.

[ * ] Notice: The portion of the term of this patent subsequent to May 19, 2004 has been disclaimed.

[21] Appl. No.: 327,364

[22] Filed: Mar. 22, 1989

Related U.S. Application Data

[63] Continuation of Ser. No. 929,650, Nov. 12, 1986, abandoned.

[51] Int. Cl.[5] ........................ G01D 15/10; B32B 5/16

[52] U.S. Cl. ................................ 428/331; 346/135.1; 346/160.1; 427/261; 428/336; 428/446; 428/450; 428/458; 428/461

[58] Field of Search ..................... 346/160.1; 428/336, 428/331

[56] References Cited

U.S. PATENT DOCUMENTS

| | | | |
|---|---|---|---|
| 3,013,897 | 12/1961 | Cuperij et al. | 428/331 |
| 3,245,833 | 4/1966 | Trevoy | 117/201 |
| 3,816,840 | 6/1974 | Kotz | 346/74 ES |
| 3,847,606 | 11/1974 | Schwartz et al. | 96/1.5 |
| 3,900,588 | 8/1975 | Fisher | 430/107 |
| 3,946,402 | 3/1976 | Lunde | 346/74 ES |
| 4,085,236 | 4/1978 | Ishibashi et al. | 427/121 |
| 4,112,172 | 9/1978 | Burwasser et al. | 428/458 |
| 4,377,612 | 3/1983 | Serlin et al. | 346/153.1 |
| 4,402,000 | 8/1983 | Fabel et al. | 346/155 |
| 4,554,562 | 11/1985 | Afzali-Aydakali et al. | 346/135.1 |
| 4,623,604 | 11/1986 | Takagiwa et al. | 430/110 |
| 4,666,780 | 5/1987 | Krum | 428/418 |
| 4,733,255 | 3/1988 | Rasbury | 346/153.1 |

FOREIGN PATENT DOCUMENTS

| | | | |
|---|---|---|---|
| 0138404 | 4/1985 | European Pat. Off. . | |
| 0057999 | 5/1977 | Japan | 428/446 |
| 6057346 | 4/1985 | Japan . | |

OTHER PUBLICATIONS

Kotz, Magnetic Stylus Recording, Journal of Applied Photographic Engineering, vol. 7, No. 2, Apr. 1981.

Chemical Abstracts, vol. 103, 1985, p. 574, Abstract No. 62519e.

European Search Report.

*Primary Examiner*—Merrell C. Cashion, Jr.

*Assistant Examiner*—Stevan A. Resan

*Attorney, Agent, or Firm*—Gary L. Griswold; Walter N. Kirn; David L. Weinstein

[57] ABSTRACT

A recording member comprising a conductive substrate having a dielectric coating thereon. The recording member is particularly useful with the electrographic recording process and apparatus described in U.S. Pat. No. 3,816,840. The dielectric coating contains a charge build-up inhibitor to allow the recording member to be used for a large number of cycles of image-formation and image-removal with virtually no build-up of charge or deterioration of image quality, and the surface of the coating is sufficiently durable to allow the recording member to be used repeatedly before the recording member needs to be replaced.

12 Claims, 2 Drawing Sheets

DIELECTRIC COATING FOR RECORDING MEMBER CONTAINING HYDROPHOBIC SILICA

This is a continuation of application Ser. No. 06/929,650 filed Nov. 12, 1986, now abandoned.

BACKGROUND OF THE INVENTION

1. Field of the Invention

The present invention relates to a recording member for the electrographic recording of toner images thereon and to a coating for the recording member, which coating provides the member with electrical, optical, and durability characteristics useful for the recording process.

2. Description of the Prior Art

Kotz, U.S. Pat. No. 3,816,840 discloses an electrographic recording process and apparatus in which a dielectric recording member is arranged between two electrodes. Magnetically adhered to one of the electrodes is electronically conductive toner powder. The toner powder provides an electrically conductive path between the electrode to which it is bound and the adjacent surface of the dielectric member. A voltage is applied to the electrodes for a time and of a magnitude sufficient to generate a force pattern on the toner which enables toner deposition on the recording member in accordance with the force pattern. The force pattern is generated directly on the toner rather than on the recording member, which is passive in the operation of the apparatus disclosed in the patent.

Resistance to mechanical damage, abrasion, and wear are important characteristics for the receptor surface of a recording member employed in a process where an appreciable number of images are required to be applied thereto and removed therefrom. These characteristics of durability can be judged by subjecting a receptor surface to repeated cycles of the process and observing the images produced for signs of catastrophic failure or gradual deterioration. The number of cycles completed while retaining the ability to produce images meeting the acceptance criteria is a measure of the surface's durability.

It is often desirable to apply the toner to a dielectric recording member which has a background color which offers high contrast to the toner powder. For example, if the contrast between toner powder and the recording member to which it is applied were sufficiently high, e.g. 0.6 optical density units, the recorded information could be read directly or indirectly, or even copied by optical means, all with high fidelity and high resolution. Then, the untransferred, unfixed toner powder could be removed from the recording member and new information could be displayed thereon. A system employing a recyclable toner powder could then be designed to optimize the quality of the displayed image without regard to its transfer and fixing properties, or to the cost of depleting the toner powder with each copy. Alternatively, the toner powder could be fixed to the recording member if so desired.

Anodized aluminum has been used as a recording member for the electrographic recording apparatus described herein. An aluminum oxide surface that has the appropriate electrical response can be formed on an aluminum substrate by anodization or other conventional means. However, it is well known that such surfaces change over time, particularly when subjected to environments having high relative humidity. This change may adversely affect the electrical characteristics of the aluminum oxide surface. Furthermore, in environments of high relative humidity, aluminum oxide surfaces tend to collect a film of moisture that must be removed by special means to assure a stable electrographic process. Finally, anodized aluminum and other such surfaces do not have the optical properties desirable for certain desirable applications of the process disclosed in the Kotz patent.

Other materials for a receptor surface which have appropriate electrical characteristics for use in a rapid cycle electrographic recording process generally are unable to withstand the mechanical abuse resulting from flexing, cycling, and the application and removal of toner powder.

A polyester film bearing an appropriate pigment can provide the desired contrast between recording member and toner powder. However, a polyester film, or a film prepared from another dielectric organic resin, when applied to a conductive grounding surface, will generally allow charge to build up resulting in excessive backgrounding and ghosting.

Over a period of use, e.g. about 100 cycles of image formation and image removal from the recording member, residual charge builds up within the dielectric recording member. This build-up of charge results in excessive backgrounding and ghosting, making the recording member useless for further image formation.

Thus, it can be seen that selection of a recording member and dielectric coating thereof for use with a recyclable imaging powder may be constrained by at least three factors:

(1) Charge must be essentially completely removed from the recording member within one operating cycle of the process;

(2) Durability properties of the recording member must be sufficient in order to allow the process to be economically feasible;

(3) Contrast between the toner powder and the recording member can be specified to be high, e.g. at least 0.6 optical density units.

Although it is relatively simple to provide a recording member that fulfills any one of the three foregoing constraints, satisfaction of all three of them simultaneously has heretofore proved to be extremely difficult. The problem of charge build-up has presented great difficulty in finding suitable materials for recording members. True resistive materials, e.g. most polymeric materials, have the undesirable tendency of trapping charges in their structural matrices. At the voltages and cycle durations of the recording process described in Kotz, the build-up of trapped charges occurs over a period of about 100 cycles. Removal of the trapped charges would require a relatively long period of time.

SUMMARY OF THE INVENTION

This invention involves a recording member suitable for use with the electrographic recording process and apparatus described in Kotz, U.S. Pat. No. 3,816,840. The recording member comprises a conductive substrate having a dielectric coating thereon. Dielectric coatings are formed from an insulating polymeric material, such as, for example, polymethyl methacrylate, having a charge build-up inhibitor, e.g. hydrophobic silica, uniformly dispersed within the dielectric coating at sufficiently high concentration.

The incorporation of a charge build-up inhibitor in the insulating polymeric material allows the use of the dielectric coating in excess of 100,000 cycles of the image-formation and image-removal process with virtually no build-up of charge or deterioration of image quality. The conductive substrate can be formed of any conductive material, e.g. metals, photoconductive materials.

The surface of the dielectric coating is sufficiently durable to allow the recording member to be used repeatedly before it needs to be replaced, e.g. the coating is able to withstand at least 100,000 cycles of image formation with toner powder and removal thereof. The dielectric coating preferably provides high contrast between toner powder and the recording member, e.g. at least 0.6 optical density units, thus allowing an image formed by said toner powder particles to be read and/or copied by optical means, e.g., cameras, photocells, projection onto a recording surface, while retaining high fidelity and high resolution on the reading surface and/or on copies prepared therefrom.

DETAILED DESCRIPTION

Figure 1:
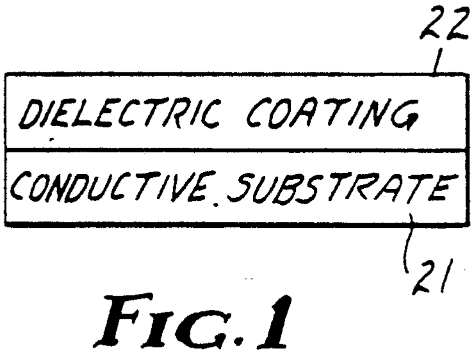
FIG. 1 is a schematic view of one embodiment of the recording member of the present invention.
Figure 2:
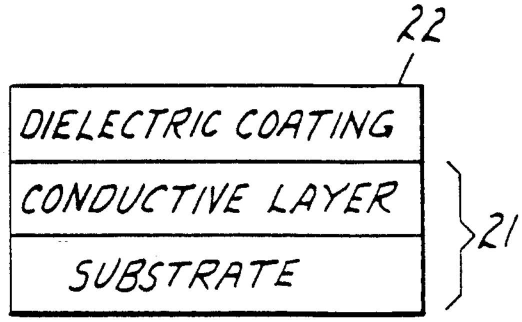
FIG. 2 is a schematic view of another embodiment of the recording member of the present invention.

FIGS. 1 and 2 show alternate embodiments of the recording member of the present invention.

Figure 3:
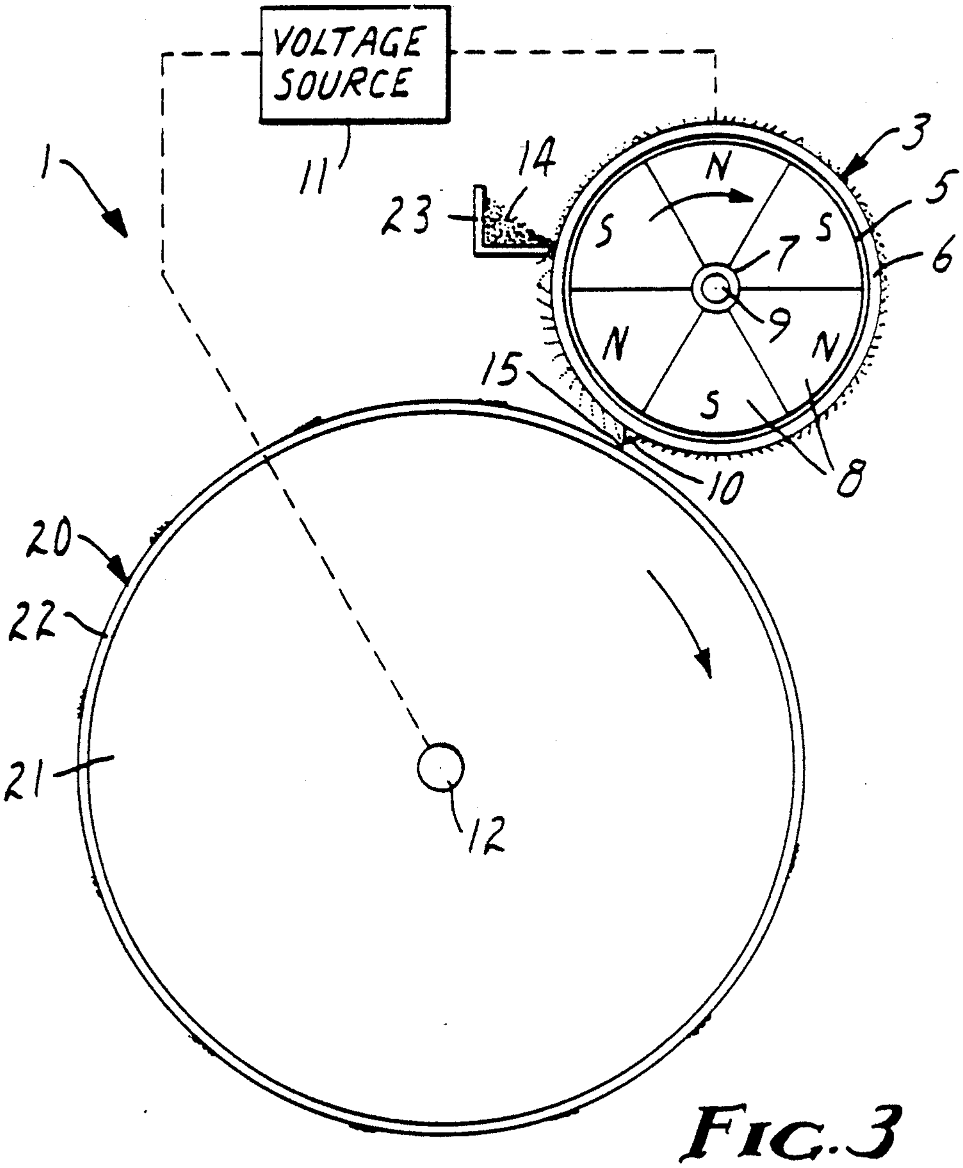
FIG. 3 is an end view of an electrographic recording system incorporating the recording member of the present invention.

Referring now to the drawings (and with specific reference first in FIG. 3) a recording system 1 employing the recording member of the present invention is shown. The recording system 1 includes a cylindrical developer roll 3 and a rotatable recording member 20.

The developer roll 3 preferably is of the type such as disclosed in Anderson, U.S. Pat. No. 3,455,276, and has an inner magnet assembly 5 and an outer cyclindrical shell 6 that is electrically nonconductive and nonmagnetic. The magnetic assembly 5 includes a cylindrical, magnet support core 7 and a plurality of permanent magnet sectors 8 arranged about the cylindrical periphery of the core 7 to define a surface having alternate North and South magnetic poles. The developer roll 3 is mounted on an axle 9 and is constructed such that the magnet assembly 5 rotates in a clockwise direction, whereas the outer shell 6 is spaced from the magnet assembly 5 and is preferably fixed in position.

Arranged on a line that extends parallel with the support core 7 are a plurality of individual, spaced apart recording electrodes 10 (only one of which is shown) that protrude from the periphery of the shell 6, but may also be disposed in the shell 6 so that the outer ends of the electrodes 10 are flush with the periphery of the shell 6.

Each electrode 10 is magnetically permeable and passes a large amount of magnetic flux emanating from the magnet sectors 8 of the developer roll 3 so that the developer roll 3 serves as a force means for providing a relatively high magnetic flux density at the outer ends of the electrodes 10. Each electrode 10 is used to print a dot that has a definition defined by its shape, density and distribution of density, and the electrodes 10 are normally utilized to serve as a printing matrix. The number of electrodes 10 employed is dependent upon the printing application for which the matrix is to be used. In the case of a standard computer output line width of one hundred thirty-six, 5×7 dot matrix characters, nearly 1000 electrodes are employed, spaced at 70/inch. For more complex character fonts and simple graphic applications, electrode spacings of 100/inch to over 400/inch are required. A voltage source 11 supplies record voltage potential pulses to the electrodes 10 in a manner and for a purpose as will be described below.

The recording member 20 is mounted on an axle 12 that is parallel to the developer roll 3 and is rotatably driven clockwise to rotate in the same direction as the developer roll magnet assembly 5. The member 20 is positioned in a spaced relationship with the electrodes 10 to define a narrow recording region 13 therebetween. Forming the member 20 are an electrically conductive cylindrical electrode 21 and an endless dielectric coating 22 that overlies the cylindrical surface of the electrode 21 Preferably, the electrode 21 is electrically grounded.

The voltage source 11 serves to provide voltage record pulses to the electrodes 10 to produce a potential difference between the electrodes 10 and the grounded electrode 13. Such potential difference results in toner deposition on the dielectric coating 22. The electrodes 10 are selectively pulsed by the source 11 to form toner images on the surface of the coating 22. The portion of the toner 14 that is deposited on the coating 22 in the form of toner images initially has a relatively high charge and is held on the coating 22 by the potential difference between the charged toner 14 and the grounded electrode 21.

The toner is preferably magnetically attractable and electronically conductive. A toner suitable for the apparatus described is disclosed in Nelson, U.S. Pat. No. 3,639,245.

A layer of magnetically attractable, electronically conducting toner 14 is metered onto the surface of electrode 10 by a doctor blade 23 which is extended in an axial direction but at a fixed space from electrode 10. The toner 14 is held and attracted to electrode 10 by the magnetic field exerted by magnet sectors 8.

The electronic properties of the recording member affect the performance of the electrographic recording system described in the Kotz patent, and the limits placed on these properties depend on the specific embodiment. However, the limits in most cases arise from the following considerations.

The resistivity of the recording member should be sufficiently high to prevent so much charge from flowing off of the toner into the recording member at such a rate as to reduce the electrical force to a level insufficient to overcome the magnetic force in image areas. Preferably, its resistivity should be at least 10 times the resistivity of the toner at electric fields comparable to those experienced by the materials in the practice of the invention of U.S. Pat. No. 3,816,840, incorporated herein by reference. The value of resistivity can be determined with an ohmmeter wherein the ohmmeter is connected to two copper bars, both of which bars are placed in contact with the dielectric surface of the recording member.

For low voltage operation, which is desirable from an economic and reliability standpoint, it is desirable to have a high electronic capacity for the recording member. It is more advantageous to achieve this through thin dielectric coatings than through a large dielectric constant coupled with a thick dielectric coating. The dielectric coating should be sufficiently thick to withstand the voltages applied during the process. A suitable thickness is at least $5\times10^{-6}$ centimeters (500 Angstroms). The thicker the dielectric coating is above the minimum thickness, the greater the voltage necessary to produce a given force for the same dielectric constant. In general, for practical reasons, the thickness of the dielectric coating is kept to a minimum above that at which electrical breakdown would occur, because thicker dielectric coatings result in reduced resolution of the developed pattern.

A sufficient amount of charge build-up inhibitor must be incorporated into the dielectric coating so as to inhibit excessive charge build-up therein. The charge build-up inhibitor interferes with charge build-up by means of a triboelectric effect. It has been discovered that hydrophobic silicas function as excellent charge build-up inhibitors. It is preferred to use a high level of hydrophobic silica in the dielectric coating. For example, from about 30 to about 95% by weight of total solid material of the dielectric coating can be hydrophobic silica. Preferably the level of hydrophobic silica is from about 50 to about 75% by weight of total solid material of the dielectric coating. The remainder of the solid material of the dielectric coating generally consists of polymeric material.

From the foregoing discussion of limits on electronic properties, it is apparent that thickness of the dielectric coating can have a significant effect on the electrographic recording process. The coating thickness can range from about 0.05 to about 5.0 micrometers, preferably from about 0.3 to about 2.0 micrometers. Coatings having a thickness far in excess of 2.0 micrometers tend to exhibit poorer image resolution or background deposition of toner powder or to require undesirably high voltages, while coatings having a thickness far below 0.3 micrometers not only tend to lack sufficient durability for a recording member employed in a cyclic electrographic recording process wherein the surface is subjected to repetitive formation and removal of images, but also tend to result in formation of poor images.

Typical ranges for parameters for dielectric coatings suitable for the present invention are as follows:

| | |
|---|---|
| Stylus voltage | 5 to 40 V |
| Minimum cycle time between image formation | several milliseconds to several seconds |
| Toner resistivity | less than $10^{10}$ ohm-cm at an applied field of about 500 volts/cm |
| Thickness of dielectric coating | $5\times10^{-6}$ cm to $2\times10^{-4}$ cm |

Other features which may affect the electronic properties of the recording member are more fully described in U.S Pat. No. 3,816,840.

Although many materials are known to exhibit suitable electronic properties for use in the process of the Kotz patent, relatively few exhibit durability properties and optical properties that render them useful for certain commercial applications, i.e. those to be viewed optically on the receptor.

It has been determined that a dielectric coating will exhibit the required level of durability if it exceeds 20,000 cycles of image formation and removal, preferably 100,000 cycles of image formation and removal before the coating has been sufficiently eroded to adversely affect the performance of the recording member. However, certain users of the recording member of this invention will not require a dielectric coating exhibiting even the lower level of durability.

The dielectric coating is preferably sufficiently low in reflection optical density so that sufficient contrast between the recording member and toner powder is assured. A suitable level of contrast is, for example, at least +0.6 optical density units. If the coating is transparent, the level of contrast between the toner powder and the material comprising the conductive substrate is, for example, at least +0.6 optical density units.

Polymeric materials that are suitable for preparing the dielectric coating of this invention are selected on the basis of the requirements of the specific application in which this recording member is to be used. Generally, the chief requirement is that the charge build-up inhibitor must readily disperse in the polymer/solvent system, if a solvent is used to apply the polymer to the conductive layer, or the polymer itself, if no solvent is used. Other consideration include adhesion to the conductive layer, color or transparency, durability, tolerance of humidity extremes, and ease of handling. Representative examples of polymer classes that are useful include acrylic, polyester, polycarbonate, polyvinyl acetate, polyvinyl chloride, polyvinyl butyral, cellulose acetate, polyvinyl alcohol, polyacrylonitrile, epoxy resins, polyamide, polyvinylpyrrolidone, polyvinyl acetal, cellulose acetate butyrate, polystyrene/butadiene, polyimide, and ethyl cellulose.

Figure 4:
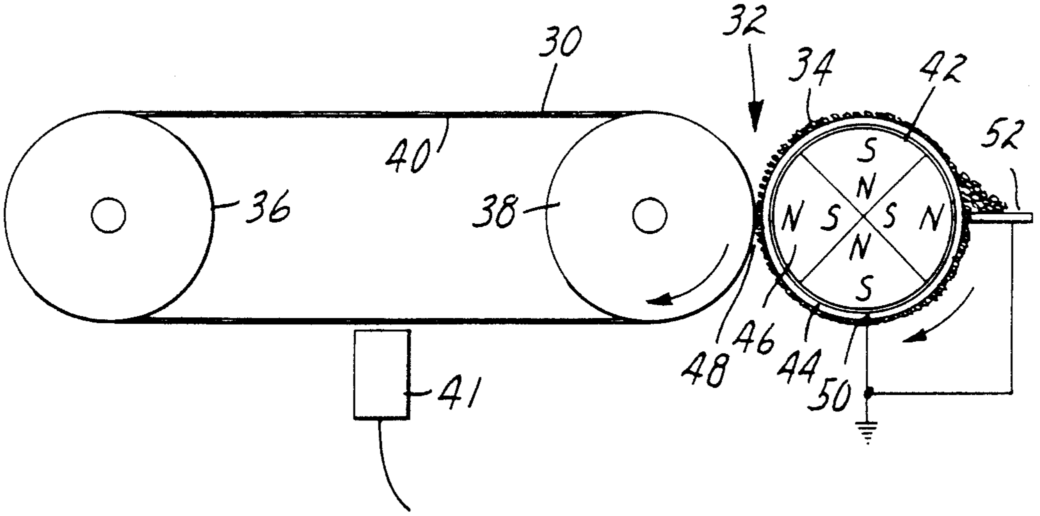
FIG. 4 is a schematic view of an apparatus that can be used to test dielectric materials to determine their suitability for the present invention.

A convenient test has been developed to determine whether a given material is suitable as a charge build-up inhibitor. The apparatus for conducting this test is shown in FIG. 4. A sample of the material for the dielectric coating 30 is mounted so that it can be moved in close proximity by an electrically grounded toner station 32. The rubbing of the toner 34 against the dielectric material 30 may produce an electrical charge on the dielectric material due to triboelectrification. The magnitude and polarity of this charge is monitored and recorded. It is preferred to provide the sample as a layer of dielectric material in belt form. Typically the belt is placed over a set of rollers 36, 38, one of which is placed in close proximity to the toner station 32. Electrical contact 40 to a conductive layer beneath the layer of dielectric material must be provided and the conductive layer held at ground potential.

The magnitude and polarity of any electrical charge on the layer of dielectric material 30 can be detected by using an electrostatic voltmeter 41, such as is manufactured by the Monroe Electronics Co. The dielectric material is passed by the moving toner station 32 for several revolutions, e.g. about 10 to about 100, and the electrical potential recorded.

The toner station 32 consists of a magnet roller 42 which is fixed so as not to rotate and an electrically conductive shell 44 which is mounted so as to rotate. Ideally, one of the magnetic poles 46 should face the nip region 48 formed between the two rollers 38 and 42. An electrical connection 50 to the shell 44 must be supplied so that the shell is held at ground potential. A doctor blade 52 is provided in order to control the thickness of the toner layer on the moving shell. The doctor blade 52 must also be held at ground potential. Typical values for the toner station are:

| | |
|---|---|
| Magnet Strength | 400–1000 Gauss peak to peak |
| Number of Poles | 4 to 8 |
| Doctor Blade Gap | 0.020 to 0.060 inches |
| Gap from Shell to Receptor | 0.030 to 0.050 inches |
| Shell Speed | 100 to 200 RPM |

Typically, the potential of the dielectric material will initially rise (either positively or negatively) from its initial ground potential and then stabilize. Toner may adhere to the surface of the dielectric material as the potential rises. Toner adherence is due to an image force on the toner caused by the accumulation of charge on the dielectric material. The value of the charge on the dielectric material alone may be measured by blowing the toner off of the dielectric layer by means of compressed air or Freon® gas. The magnitude of charge build-up will depend on the relative humidity and should therefore be controlled.

A material will be successful as a charge build-up inhibitor if the magnitude of the charge measured in the above manner is from about one to about ten volts. It is important to note that the material under study will only be successful as a charge build-up inhibitor if the stylus printing polarity is opposite that which was measured in the above test. If the polarity of the stylus printing voltage is the same as that measured in this test, the excessive backgrounding and/or ghost images will result.

Representative examples of charge build-up inhibitors that are suitable for the recording member of this invention include hydrophobic silica. Hydrophilic silica is not useful for the present invention.

The conductive substrate can be formed of either a self-supporting conductive material or a layer of conductive material applied to a non-conductive supporting substrate such as, for example, a flexible belt made of a polymeric material, in which case, the recording member itself would be flexible. In an example of a self-supporting conductive material, as shown in FIG. 1, the conductive substrate can be a metal drum made of brass, aluminum, steel, or the like, having sufficient conductivity to fulfill the requirements of the electrical circuit of the recording system. The conductive substrate is in contact with ground to create a potential difference between the surface and ground plane. Alternatively, a layer of conductive material can be applied to the surface of non-conductive supporting substrate, e.g. a polymeric film, in which case, the conductive layer occupies an intermediate position between the polymeric film and the dielectric coating. This embodiment is shown in FIG. 2.

Materials suitable for the conductive layer include metallic foils or sheets, such as aluminum or copper, metallic coatings such as gold, or metals deposited by one of a number of means such as vapor, sputtering, or plasma deposition, and conductive metal oxide films such as indium tin oxide, which can be deposited by a number of means.

The conductive layer is required to exhibit sufficient conductivity so as to transport charge at a rate consistent with the desired application. It has been found that conductive layers exhibiting resistivity less than 5000 ohms per square are generally useful in most applications.

It is preferred that the conductivity of the conductive layer not decrease below the desired level with time or with exposure of the recording member to changing environmental conditions such as exposure to high or to low relative humidity.

In situations wherein visual display or optical projection of the toner image is contemplated and the dielectric layer is transparent, e.g., to visible light, the conductive layer should also exhibit the appropriate degree of transparency, reflectivity, or opacity, e.g., to visible light, for the desired effect.

When visual display or optical projection of the reflected toner image is contemplated, it is preferred that the recording member produce a non-specular rather than specular reflection. A non-specular background to the image simplifies the arrangement of optical elements used when optical projection is considered.

It is often preferred that any non-conductive supporting substrate of the recording member be a flexible polymeric film. The film is relatively inexpensive, it is easily coatable, and the resulting product can be converted into various shapes and sizes, e.g. an endless belt for use in an electrographic recording system.

The polymeric film can be any material that has sufficient stability to undergo the processing steps required to fabricate the recording member and to function with acceptable durability and stability in the electrographic recording system. Among polymeric materials suitable for forming the polymeric film are polyesters, polyolefins, polyamides, polyimides and vinyls. Polyester films are preferred because they can be produced with smooth surfaces, are resistant to attack from solvents, are resistant to heat distortion, and have good physical properties such as good tensile strength. Representative examples of commercially available polyester films are various grades of Scotchpar®, manufactured by Minnesota Mining and Manufacturing Company, various grades of Mylar®, manufactured by E. I. DuPont de Nemours Corporation, and various grades of Melinex®, manufactured by ICI.

The following examples are meant to illustrate, but not limit this invention. Parts and percentages are by weight unless otherwise indicated.

EXAMPLE 1

The following ingredients, in the amounts, indicated, were used to prepare a composition for the dielectric coating of the recording member:

| Ingredient | Amount (g) |
|---|---|
| Resin ("Acryloid A-21", available from Rohm and Haas, Inc.) | 2 |
| Methyl ethyl ketone | 47.5 |
| Toluene | 47.5 |
| Hydrophobic silica ("Aerosil R972", available from Degussa, Inc.) | 3 |

The resin was introduced into the solvent mixture, and the mixture was stirred until the resin was dissolved. The silica was then added to the mixture and dispersed by appropriate means, e.g. high frequency dispersion equipment, such as the "Super Dispax" disperser, available from Tekmar. The resulting dispersion was then coated at a wet thickness of two mil and dried at 200° F. for four minutes.

EXAMPLE 2

Example 1 was repeated, the only exceptions being (a) one gram of "Acryloid A-21" resin was used instead of two, and (b) four grams of "HDK 2000" hydrophobic silica from Wacker was used instead of three grams of Aerosil R972 hydrophobic silica. The composition of Example 2 was preferred because it allowed a higher loading of silica and a more stable dispersion. Both compositions provided excellent imaging performance in the apparatus previously described over a period comprising 50,000 to 100,000 cycles.

Various modifications and alterations of this invention will become apparent to those skilled in the art without departing from the scope and spirit of this invention, and it should be understood that this invention is not to be unduly limited to the illustrative embodiments set forth herein.

We claim:

1. A recording member suitable for use in an electrographic recording system for recording toner images on a recording member, said system including first and second opposed electrodes spaced apart to define a recording region therebetween, means for driving the recording member through said recording region, and a means for transporting electrically conductive toner powder from a toner reservoir to said recording region to selectively deposit on said recording member in response to the selective application of voltage pulses across said electrodes, said recording member comprising a conductive substrate bearing a dielectric coating comprising a polymeric material containing hydrophobic silica therein in an amount sufficient to develop triboelectric charge to interfere with the build-up of charge in the dielectric coating, said amount comprising from about 30% up to about 95% by weight of the dielectric coating, said dielectric coating having a thickness ranging from about 0.05 to about 5.0 micrometers.

2. A recording member according to claim 1 wherein said hydrophobic silica comprises from about 50% up to about 75% by weight of the dielectric coating.

3. A recording member according to claim 1 wherein said member is sufficiently low in optical density so that the contrast between said recording member and said toner is at least 0.6 optical density units.

4. A recording member according to claim 1 wherein said conductive substrate is made from a conductive metal.

5. A recording member suitable for use in an electrographic recording system for recording toner images on a recording member, said system including first and second opposed electrodes spaced apart to define a recording region therebetween, means for driving the recording member through said recording region, and a means for transporting electrically conductive toner powder from a toner reservoir to said recording region to selectively deposit on said recording member in response to the selective application of voltage pulses across said electrodes, said recording member comprising a conductive substrate bearing a dielectric coating comprising a polymeric material containing hydrophobic silica therein in an amount sufficient to develop triboelectric charge to interfere with the build-up of charge in the dielectric coating, said amount comprising from about 30% up to about 95% by weight of the dielectric coating, said dielectric coating having a thickness ranging from about 0.05 to about 5.0 micrometers, wherein said conductive substrate comprises a conductive layer supported by a non-conductive insulating substrate.

6. A recording member suitable for use in an electrographic recording system for recording toner images on a recording member, said system including first and second opposed electrodes spaced apart to define a recording region therebetween, means for driving the recording member through said recording region, and a means for transporting electrically conductive toner powder from a toner reservoir to said recording region to selectively deposit on said recording member in response to the selective application of voltage pulses across said electrodes, said recording member comprising a conductive substrate bearing a dielectric coating comprising a polymeric material containing hydrophobic silica therein in an amount sufficient to develop triboelectric charge to interfere with the build-up of charge in the dielectric coating, said amount comprising from about 30% up to about 95% by weight of the dielectric coating, said dielectric coating having a thickness ranging from about 0.05 to about 5.0 micrometers, wherein said conductive substrate is transparent to visible light.

7. A recording member according to claim 1 wherein said dielectric coating is transparent to visible light.

8. A recording member according to claim 1 wherein the thickness of said dielectric coating is from about 0.05 micrometers to abut 5:0 micrometers.

9. A recording member according to claim 1 wherein the thickness of said dielectric coating is from about 0.3 micrometers to about 2.0 micrometers.

10. A recording member according to claim 1 wherein said member is flexible.

11. The recording member of claim 1 wherein said conductive substrate has a resistivity of less than 5000 ohms per square.

12. The recording member of claim 9 wherein said dielectric coating is transparent to visible light.

* * * * *

UNITED STATES PATENT AND TRADEMARK OFFICE

CERTIFICATE OF CORRECTION

PATENT NO. : 5,064,715

DATED : November 12, 1991

INVENTOR(S) : Rasbury et al.

It is certified that error appears in the above-identified patent and that said Letters Patent is hereby corrected as shown below:

Col. 10, line 43, "5:0" should be --5.0--.

Signed and Sealed this

Fourth Day of January, 1994

Attest:

Bruce Lehman

BRUCE LEHMAN

Attesting Officer

Commissioner of Patents and Trademarks